L. H. WOODCOCK & C. BORENE.
ANGLE SAW.
APPLICATION FILED APR. 30, 1910.

983,338.

Patented Feb. 7, 1911.

WITNESSES:
Mary Sholderer
H. L. Barrett

Louis H. Woodcock
Charles Borene
INVENTORS

BY
L. L. Westfall their ATTORNEY

THE NORRIS PETERS CO., WASHINGTON, D. C.

UNITED STATES PATENT OFFICE.

LOUIS H. WOODCOCK AND CHARLES BORENE, OF SPOKANE, WASHINGTON.

ANGLE-SAW.

983,338. Specification of Letters Patent. Patented Feb. 7, 1911.

Application filed April 30, 1910. Serial No. 558,614.

*To all whom it may concern:*

Be it known that I, LOUIS H. WOODCOCK and CHARLES BORENE, citizens of the United States, residing at Spokane, in the county of Spokane and State of Washington, have invented certain new and useful Improvements in Angle-Saws, of which the following is a specification.

This invention pertains to angle saws and has for its object to provide a saw with which one may cut square or rectangular holes in wood or other materials. In fact a saw with which one can turn at right angles while sawing without the necessity of boring a hole in the material or using any other instrument than the saw with which one is working. The same principle or mechanism with variations can be used for sawing at a greater or a less than a right angle.

The mechanism consists of adding to a saw blade with teeth of ordinary construction, a miniature saw setting at right angles with the main saw body near the end where the handle is attached thereto. The miniature saw mentioned to set at right angles with the lower edge of the main saw body, with its narrowest or pointed end reaching away from the handle portion and increasing in width as it approaches the handle.

Figure 1:
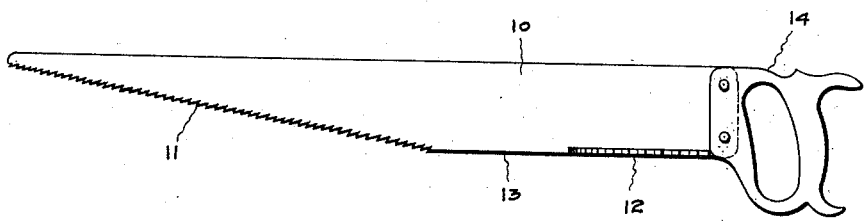
Figure 2:
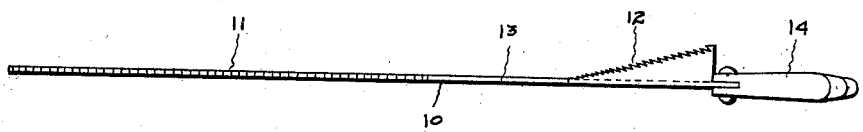

In the drawings, Figure 1, is a side view of the improved saw complete, and Fig. 2, is an edge view thereof.

The main saw body 10 is provided with teeth 11 as usual and a handle 14 of ordinary construction. Reaching approximately to the handle 14 and setting at right angles with the lower edge of the saw blade 10, is a miniature saw blade 12, extending outward toward the main saw teeth and becoming narrower in width as it approaches outward until it reaches a very fine and pointed contact with the side of the lower edge of the main saw blade 10. The teeth of this miniature saw blade are graduated down to a very small size as the point of contact with the main saw body is reached.

Between the main cutting portion 11 and the miniature cutting portion 12, a space 13 is left to prevent the miniature cutting portion 12 from being brought into cutting engagement with the material being sawed until it is desired for that purpose.

In the practical operation of the saw for the cutting of material and turning at right angles, the main saw portion 11 would be used until the turning point was reached, then the main body 10 would be crowded forward sufficiently for the miniature saw portion 12 to reach the material and this saw would then be used cutting at right angles a limited distance or sufficient for the main saw portion carrying the teeth 11 to work conveniently in the sawed space and work would resume with the same. One angle after another would likewise be turned as desired. In this manner holes may be sawed in the center, in the side or in the end of a board.

Having thus described our invention, what we claim as new and useful and desire to secure by Letters Patent is:

An angle saw, the combination with a main saw body having a miniature saw portion set at right angles with the lower edge of the main saw body near the handle thereof, the greatest width thereof being nearest the handle portion and narrowing down to nothing at its outer contact with the main saw body, of a smooth, horizontal, untoothed portion on the main saw blade, reaching for a distance outward toward the small end of the saw from the point of contact of the two saw blades farthest from the handle portion, substantially as described.

In testimony whereof we affix our signatures in presence of two witnesses.

LOUIS H. WOODCOCK.
CHARLES BORENE.

Witnesses:
EUGENE B. FAVRE,
MARY SHOLDERER.